(12) United States Patent
Kabra et al.

(10) Patent No.: US 7,500,020 B1
(45) Date of Patent: Mar. 3, 2009

(54) COHERENCY OF REPLICAS FOR A DISTRIBUTED FILE SHARING SYSTEM

(75) Inventors: Navin Kabra, Pune (IN); Anindya Banerjee, West Bengal (IN); BijayaLaxmi Nanda, Orissa (IN); Sivaramakrishna Ramadugu Venkata, Hyderabad (IN); Dilip Madhusudan Ranade, Pune (IN); Radha Shelat, Pune (IN); Laxmikant Vithal Gunda, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 852 days.

(21) Appl. No.: 10/749,365

(22) Filed: Dec. 31, 2003

(51) Int. Cl.
*G06F 15/16* (2006.01)
*G06F 12/00* (2006.01)

(52) U.S. Cl. .................. 709/248; 709/246; 707/201

(58) Field of Classification Search .................. 709/246, 709/248; 707/9, 201–204
See application file for complete search history.

(56) References Cited

U.S. PATENT DOCUMENTS

| | | | | |
|---|---|---|---|---|
| 5,434,994 A * | 7/1995 | Shaheen et al. | ............. | 709/223 |
| 5,689,706 A | 11/1997 | Rao et al. | | |
| 5,774,717 A | 6/1998 | Porcaro | | |
| 5,806,075 A * | 9/1998 | Jain et al. | .................... | 707/201 |
| 5,832,225 A * | 11/1998 | Hacherl et al. | ............... | 709/223 |
| 6,173,293 B1 | 1/2001 | Thekkath et al. | | |
| 6,457,011 B1 * | 9/2002 | Brace et al. | .................... | 707/10 |
| 6,516,327 B1 * | 2/2003 | Zondervan et al. | .......... | 707/200 |

(Continued)

OTHER PUBLICATIONS

A. Rowstron and P. Druschel. "Pastry: Scalable, distributed object location and routing for large-scale peer-to-peer systems." In Proc. *IFIP/ACM Middleware 2001*, Hiedelburg, Germany, Nov. 2001.

(Continued)

*Primary Examiner*—William C Vaughn, Jr.
*Assistant Examiner*—Yemane Mesfin
(74) *Attorney, Agent, or Firm*—Meyertons Hood Kivlin Kowert & Goetzel, P.C.; B. Noël Kivlin; Jason L. Burgess

(57) ABSTRACT

A plurality of data objects may be replicated across a plurality of computing nodes coupled to a network. The network may include a first node operable to initiate an update operation to update a plurality of replicas of a first object. If one or more of the replicas are not reachable then the update operation may update a subset (e.g., a quorum) but not all of the replicas. For each node on which one of the replicas was updated in the update operation, the node may add the object to a list of incoherent objects. The list of incoherent objects may subsequently be used to bring the lagging replicas in sync with the replicas that were updated. In another embodiment, a plurality of replicas of an object may be stored on a plurality of nodes, similarly as described above. A first node that stores a replica of the object may store a first timestamp associated with the replica on the first node. The timestamp may be used to ensure that the replica on the first node is coherent with respect to one or more other replicas by periodically communicating with the one or more other replicas when a threshold amount of time has passed without the replica on the first node receiving an update.

16 Claims, 9 Drawing Sheets

U.S. PATENT DOCUMENTS

| | | | |
|---|---|---|---|
| 6,584,548 B1 | 6/2003 | Bourne et al. | |
| 6,601,070 B2 | 7/2003 | Zhang et al. | |
| 6,611,848 B1 | 8/2003 | Bradley | |
| 6,615,223 B1* | 9/2003 | Shih et al. | 707/201 |
| 6,625,604 B2 | 9/2003 | Muntz et al. | |
| 6,718,347 B1* | 4/2004 | Wilson | 707/201 |
| 6,748,381 B1 | 6/2004 | Chao et al. | |
| 6,782,389 B1 | 8/2004 | Chrin et al. | |
| 6,839,769 B2 | 1/2005 | Needham et al. | |
| 6,874,001 B2 | 3/2005 | Narang et al. | |
| 6,910,053 B1* | 6/2005 | Pauly et al. | 707/203 |
| 6,910,098 B2* | 6/2005 | LeCrone et al. | 711/112 |
| 7,035,922 B2* | 4/2006 | Parham | 709/224 |
| 7,039,661 B1* | 5/2006 | Ranade | 707/204 |
| 7,072,911 B1* | 7/2006 | Doman et al. | 707/201 |
| 7,152,076 B2* | 12/2006 | Sundararajan et al. | 707/203 |
| 7,158,998 B2* | 1/2007 | Bhuyan | 707/201 |
| 2002/0065919 A1 | 5/2002 | Taylor | |
| 2002/0114341 A1 | 8/2002 | Sutherland | |
| 2002/0147815 A1 | 10/2002 | Tormasov | |
| 2002/0188624 A1* | 12/2002 | Landin | 707/203 |
| 2005/0086384 A1* | 4/2005 | Ernst | 709/248 |

OTHER PUBLICATIONS

Zhao, et al "Tapestry: An Infrastructure for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACM SIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5$^{TH}$ OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Lustre Whitepaper Version 1.0" Cluster File Systems, Inc., Nov. 11, 2002.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

\* cited by examiner

COHERENCY OF REPLICAS FOR A DISTRIBUTED FILE SHARING SYSTEM

BACKGROUND OF THE INVENTION

1. Field of the Invention

This invention relates to computer networks and file storage systems. More particularly, the invention relates to a system and method for providing coherency of file replicas (or other types of object replicas) for a distributed file sharing system.

2. Description of the Related Art

Computer networks are important for many different applications. One important type of networking is referred to as peer-to-peer or P2P networking. As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction among the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed processing, etc.

A peer-to-peer network may be especially useful for applications which utilize distributed or shared data, in part because the reliance on centralized servers to access data can be reduced or eliminated. In particular, it may be desirable to implement a distributed file sharing system using a P2P network.

In some distributed file sharing systems, files may be replicated on multiple nodes in the system. One problem involved in such a system is how to maintain coherency among the various replicas of a file. Prior art techniques for handling this problem fall into two general categories: high coherency and loose coherency. In a highly coherent system, latency and availability are typically sacrificed in the interests of data correctness and coherency. All the replicas are always kept coherent, but update operations take longer. Also, fewer failures are required to make a file inaccessible.

In a loosely coherent system, availability and low latency for file access operations are stressed. However, these systems typically suffer from lack of data coherency guarantees. Thus, it may be desirable to provide a system with high file availability and low access latency that also provides strong coherency guarantees.

SUMMARY

According to one embodiment, a plurality of data objects (e.g., files or other objects) may be replicated across a plurality of computing nodes coupled to a network. For example, the plurality of data objects may include a first object, where a plurality of replicas of the object are stored on a first plurality of the nodes.

The network may include a first node operable to initiate an update operation to update the plurality of replicas of the object. In one embodiment, the update operation may attempt to update all of the replicas of the object, but one or more of the replicas may not be reachable. In this case, the update operation may update a subset (e.g., a quorum) but not all of the replicas. For each node on which one of the replicas was updated in the update operation, the node may add the object (e.g., may add an ID of the object) to a list of incoherent objects.

Updating the subset of the replicas may include updating a first replica, where the first replica is stored on a second node. Thus, the second node may add the object to its list of incoherent objects. After adding the object to its list of incoherent objects, the second node may subsequently attempt to communicate with all the replicas of the object. If all the replicas of the object are reachable then the replicas that were not in the subset of replicas that were updated may be synchronized with the replicas that were updated. In one embodiment, the second node may be operable to periodically attempt to communicate with all the replicas of the object.

According to another embodiment, a plurality of replicas of an object may be stored on a plurality of nodes, similarly as described above. The plurality of nodes may include a first node on which a replica of the object is stored. The first node may be operable to store a first timestamp associated with the replica on the first node.

In response to receiving a read request, the first node may be operable to determine whether time elapsed since the time indicated by the first timestamp exceeds a first threshold amount. If not then the first node may respond to the read request using the replica on the first node. However, if the time elapsed does exceed the first threshold amount then the first node may be communicate with a second node to synchronize the replica on the first node with a replica on the second node if necessary. The first node may then respond to the read request using the replica on the first node after communicating with the second node.

BRIEF DESCRIPTION OF THE DRAWINGS

A better understanding of the invention can be obtained when the following detailed description is considered in conjunction with the following drawings, in which.

Figure 1:
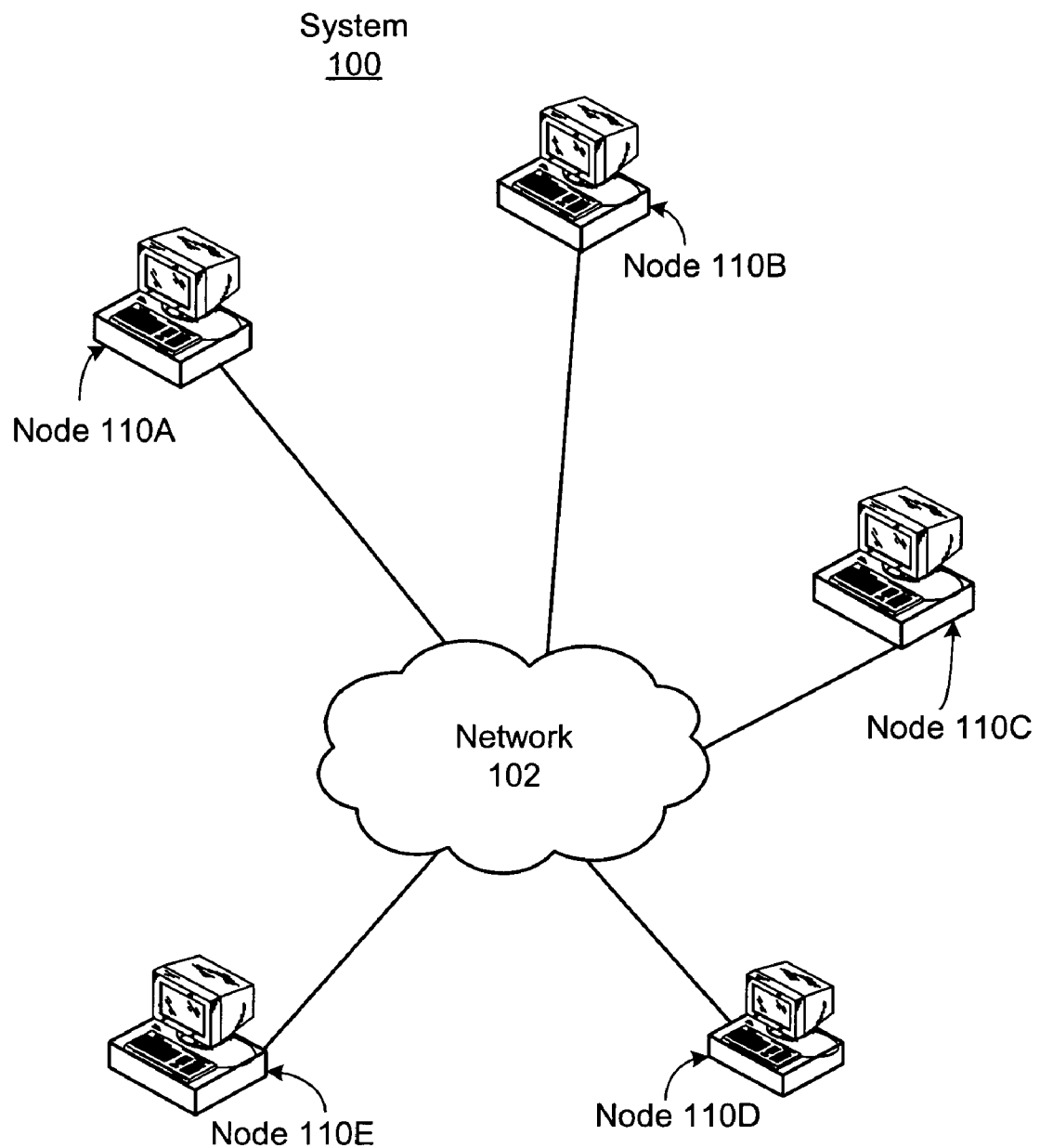
FIG. 1 illustrates one embodiment of a system including a plurality of nodes operable to perform distributed file sharing.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system 100 that includes a plurality of nodes (e.g., computer systems) 110. As described below, the plurality of nodes 110 may be operable to communicate to perform distributed file sharing. In this example, the system 100 includes nodes 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. As described below, each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit (or other length) Universally Unique ID (UUID). Universally Unique IDs or UUIDs may be allocated based on known art that ensures that the UUIDs are unique.

Figure 2:
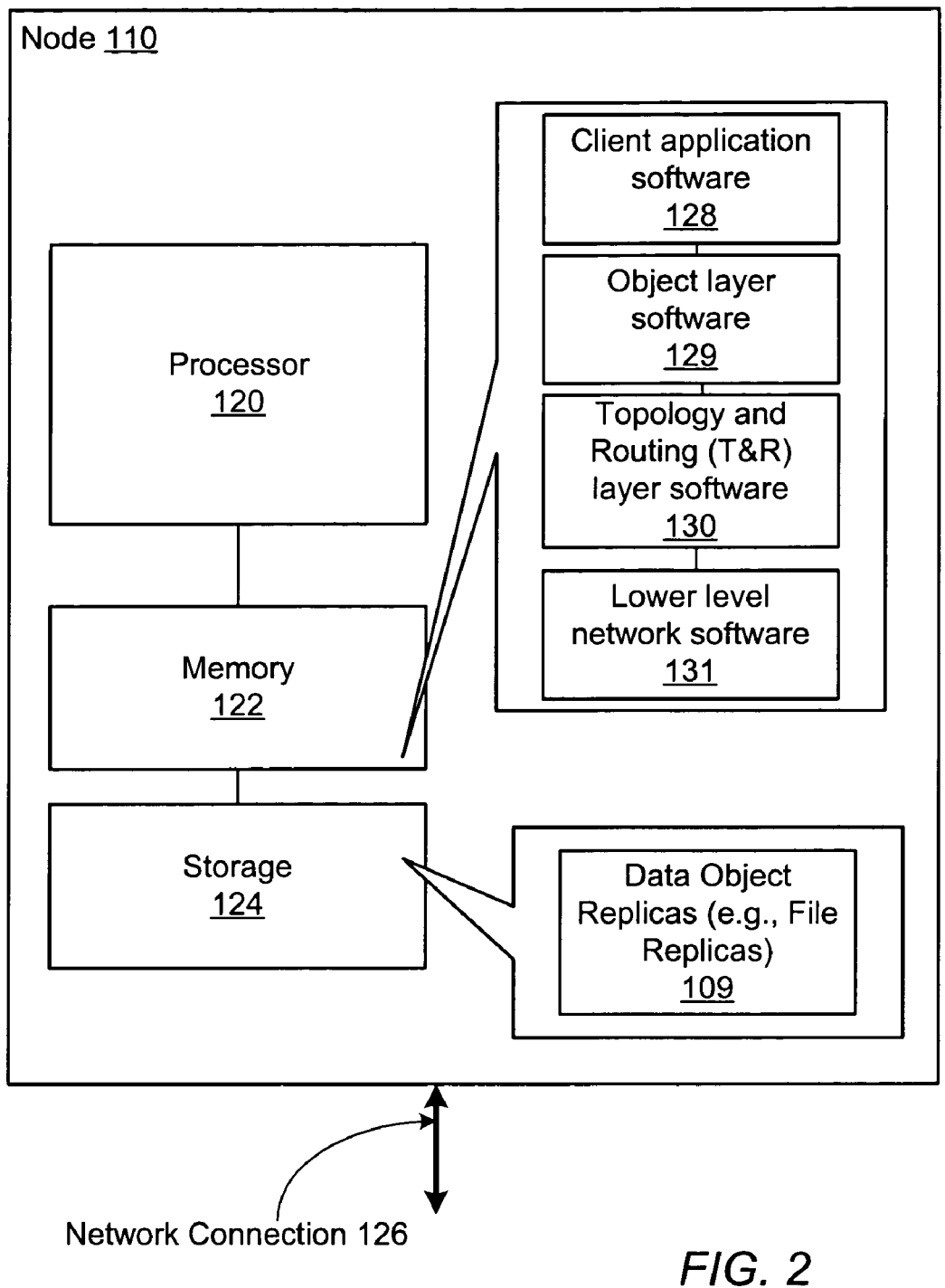
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage device 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a stable or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RAM disks, for example.

As shown in FIG. 2, in one embodiment the storage 124 may store one or more data object replicas 109. In various embodiments, replicas of any kind of data object may be utilized in the system 100. For example, in one embodiment a data object may comprise a file. Thus, the data object replicas 109 may comprise replicas of files. In general, a data object may comprise data or information of any kind, where the data is organized or structured in any way. In various embodiments, the data object replicas 109 may be utilized within the system 100 in any application or to perform any function. Any number of replicas 109 may be stored in the storage 124 of a given node 110.

In one embodiment, each data object may have an identifier (ID). In one embodiment, multiple replicas 109 of the same data object may be referenced using the ID of the corresponding data object. The ID of a data object may comprise any kind of information usable to identify the data object. In one embodiment, a data object ID may comprise a 128-bit Universally Unique ID (UUID).

Various data objects may be replicated on different nodes 110. In other words, for a given data object, multiple nodes may have replicas 109 of the data object. As used herein, the term replica refers to an entity, e.g., a data structure or software construction, that represents a data object. Each replica 109 of a data object may include at least a portion of the data for the data object. (In one embodiment, a replica 109 may also be an empty replica that does not include any of the data object's data.) As described below, at any given time, multiple replicas 109 of a given data object may be in various states of coherency or synchronization with respect to each other.

Exemplary embodiments of techniques for maintaining coherency among data object replicas 109 are discussed below.

Replicating data objects across multiple nodes 110 in the system 100 may enable the nodes 110 to share data objects in a distributed manner, e.g., the nodes 110 may store files in a distributed manner. A given replica 109 on a given node 110 may be stored as any of various types of replicas. Exemplary types of replicas are described in detail below.

In one embodiment, the memory 122 may store lower level network software 131. The lower level network software 131 (also referred to as link layer software) may be executable by the processor 120 to interact with or control the network connection 126, e.g., to send and receive data via the network connection 126. The lower level network software 131 may also be responsible for discovering other nodes 110 or establishing communication links from the node 110 to other nodes 110. The memory 122 may also store topology and routing (T&R) layer software 130 that utilizes the lower level network software 131. The memory 122 may also store object layer software 129 that utilizes the T&R layer software 130 and client application software 128 that utilizes the object layer software 129 and the T&R layer software 130.

In one embodiment, the T&R layer software 130 may be executable by the processor 120 to create and manage data structures allowing client application software 128 and/or object layer software 129 to communicate with other nodes 110 in the system 100, e.g., to communicate with other client application software 128 or object layer software 129 executing on other nodes 110. In one embodiment, the T&R layer software 130 may be utilized to send messages to other nodes 110 via links established by the link layer software. Similarly, the T&R layer software 130 may pass messages received from other nodes 110 to the client application software 128 or object layer software 129, e.g., messages which originate from client application software 128 or object layer software 129 executing on other nodes 110. The T&R layer software 130 may also be involved in forwarding messages routed through the local node 110, where the messages originate from another node 110 and are addressed to another node 110 in the system 100.

In one embodiment the functionality of the T&R layer software 130 may be modularized into builder functionality and router functionality. For example, a builder component or engine 132 may be responsible for creating and managing data structures or routing information 136 representing topology of the system 100. A router component or message routing engine 134 may utilize the data structures or routing information 136 to send or forward messages to other nodes 110 in the system 100. The builder 132 and router 134 may interface with each other as necessary. For example, in the event of a network failure that invalidates existing routing information, the router 134 may request the builder 132 to recover or rebuild routing information 136 so that the router 134 can send or forward a message using a different route.

The object layer software 129 may be operable to create and manage replicas 109. Replica management functions performed by the object layer software 129 according to one embodiment are described in detail below. The object layer software 129 may utilize the T&R layer software 130 to communicate with other nodes 110 to manage the replicas 109.

Figure 3:
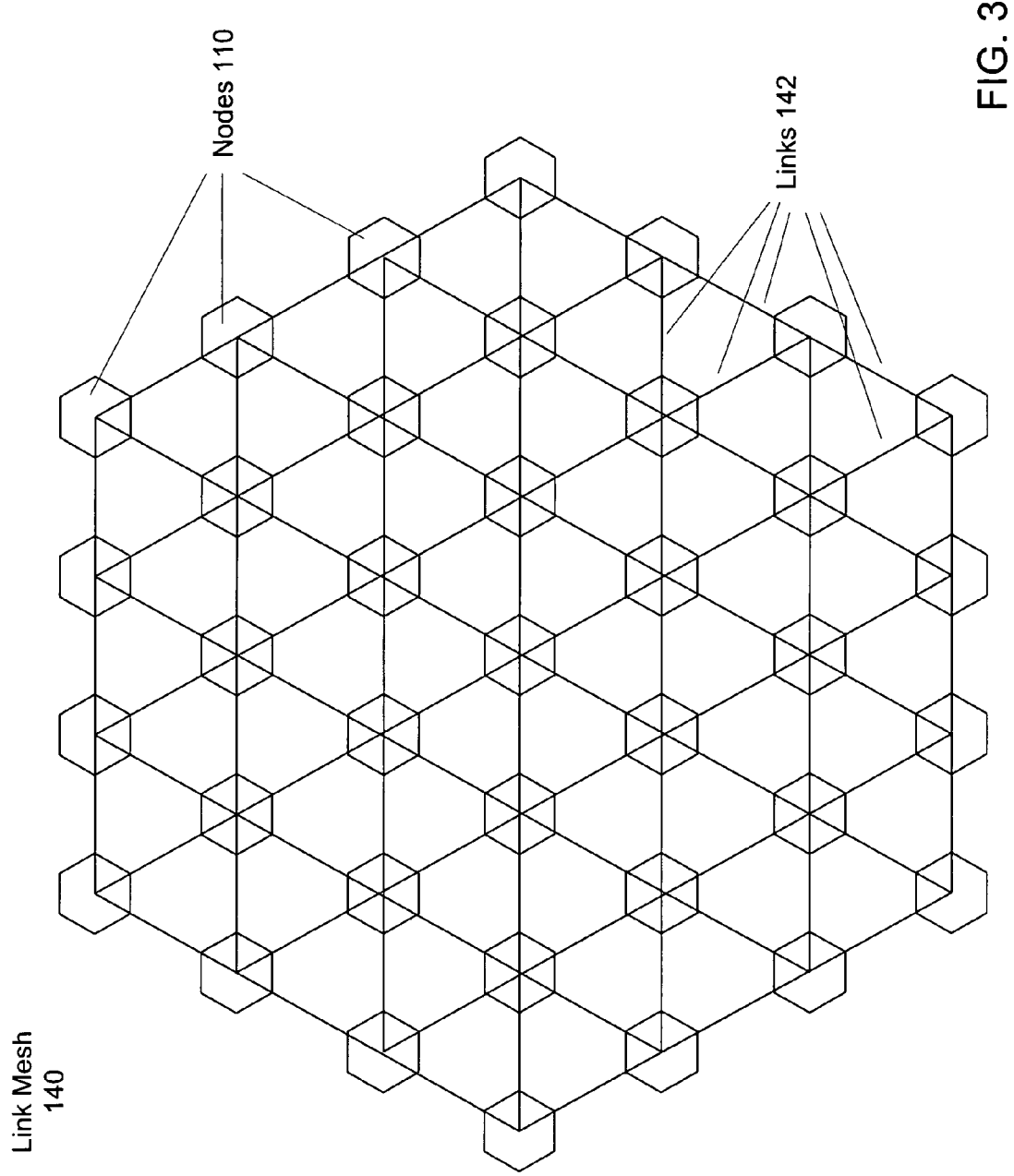
FIG. 3 illustrates a link mesh utilized by the system according to one embodiment.

FIG. 3 illustrates a link mesh 140 utilized by the system 100 according to one embodiment. In this embodiment, as each node 110 joins the system 100, the node 110 may establish links 142 with at least a subset of other nodes 110 in the system 100. As used herein, a link 142 may comprise a virtual communication channel or connection between two nodes 110. Thus, the links 142 are also referred to herein as virtual links 142. Each link 142 may be bi-directional so that each of the two nodes connected by the link 142 can use the link 142 to communicate with the other node.

In one embodiment, the lower level network software 131 executing on a given node 110 may be responsible for performing a node discovery process and creating links 142 with other nodes 110 as the node 110 comes online in the system 100. For example, in one embodiment, the lower level network software 131 may include a link layer that invokes a node discovery layer and then builds virtual node-to-node communication channels or links 142 to one or more of the discovered nodes 110. The nodes 110 with which a given node 110 establishes links are also referred to herein as neighbor nodes, or simply neighbors.

The resulting set of connected nodes 110 is referred to herein as a link mesh 140. In FIG. 3, each hexagon represents a node 110, and each line represents a link 142 between two nodes 110. It is noted that FIG. 3 is exemplary only, and in various embodiments, any number of nodes 110 may be connected by the link mesh 140, and each node 110 may establish links 142 to any number of neighbor nodes 110.

The nodes 110 interconnected by virtual links 142 may effectively comprise an overlay network in which nodes communicate by routing messages to each other over the established links 142. In various embodiments, each virtual link 142 may be implemented using any of various networking methodologies or protocols. For example, in one embodiment, each virtual link 142 may be implemented using a network protocol such as TCP or UDP. Although a virtual link 142 may directly connect two nodes 110 with respect to the overlay network, the virtual link 142 may be implemented as a network connection that passes through one or more intermediate devices or computer systems. For example, a virtual link 142 may be implemented as a network connection that passes through one or more devices such as routers, hubs, etc. However, when a first node 110 establishes a virtual link 142 to a second node 110, the first node 110 may pass messages to the second node 110 (and vice versa) via the virtual link 142 without the message being seen as a message on the overlay network by any intermediate nodes 110.

In one embodiment, nodes 110 in the system 100 may be organized or divided into multiple realms. As used herein, a realm refers to a group of nodes 110 that communicate with each other in a low-latency, reliable manner and/or physically reside in the same geographic region. In one embodiment, each realm may comprise a local area network (LAN). In another embodiment, a single LAN may comprise multiple realms.

As used herein, a LAN may include a network that connects nodes within a geographically limited area. For example, one embodiment of a LAN may connect nodes within a 1 km radius. LANs are often used to connect nodes within a building or within adjacent buildings. Because of the limited geographic area of a LAN, network signal protocols that permit fast data transfer rates may be utilized. Thus, communication among nodes 110 within a LAN (or within a realm) may be relatively efficient. An exemplary LAN may include an Ethernet network, Fiber Distributed Data Interface (FDDI) network, token ring network, etc. A LAN may also connect one or more nodes via wireless connections, such as wireless Ethernet or other types of wireless connections.

In one embodiment, each realm or LAN may have an identifier (ID). The ID of a realm may comprise any kind of information usable to identify the realm, such as numeric or textual information. In one embodiment, a realm ID may comprise a 128-bit Universally Unique ID (UUID).

For any given node 110 in a given realm, links 142 may be established from the node 110 to other nodes 110 in the same realm and/or to nodes 110 in other realms (remote realms). The term "near neighbors" may be used to refer to nodes 110 to which the given node 110 is connected in the same realm. The term "remote neighbors" may be used to refer to nodes 10 to which the given node 110 is connected in other realms. As various messages are sent from a given node 10 in a given realm to other nodes 110, the messages may be sent to near neighbors and/or remote neighbors. In one embodiment, send operations may be restricted to the local realm where possible. This may be useful, for example, to avoid the overhead of a wide area network (WAN) transfer. In one embodiment, an application programming interface (API) for sending a message may allow the sender to specify whether or how to restrict the send operation in this manner.

Figure 4:
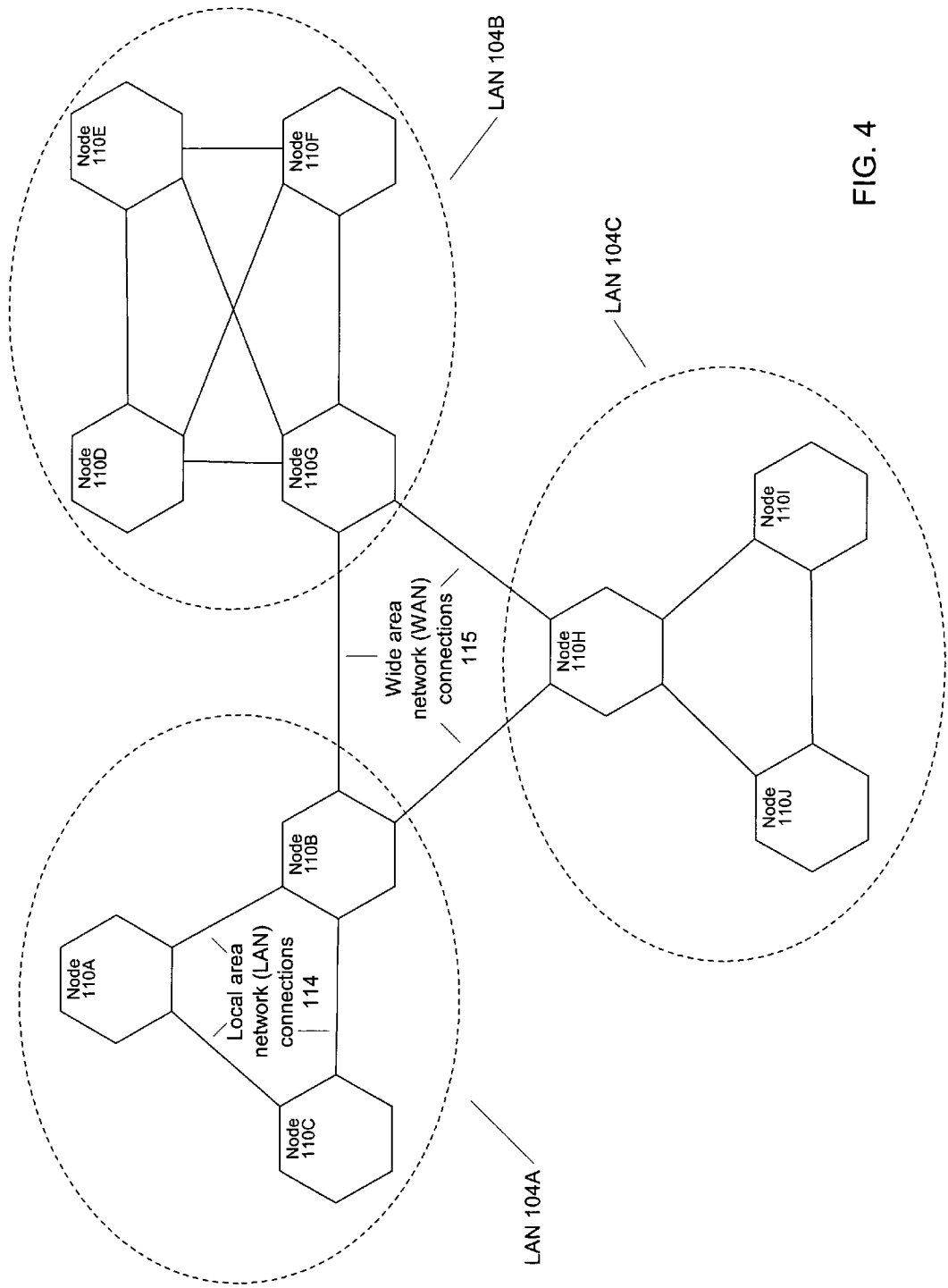
FIG. 4 illustrates one embodiment of the system organized into three local area networks (LANs)

FIG. 4 illustrates one embodiment of a system 100 organized into three LANs 104. In one embodiment, each LAN 104 may comprise a separate realm. LAN 104A includes nodes 110A-110C; LAN 104B includes nodes 110D-110G; and LAN 104C includes nodes 110H-110J. Each line connecting two nodes 110 within a LAN 104 may represent a LAN connection 114, e.g., an Ethernet connection, FDDI connection, token ring connection, or other connection, depending on the type of LAN utilized.

As used herein, a "wide area network (WAN) connection" may comprise a network connection between two nodes in different realms or LANs 104. As shown in FIG. 4, WAN connections 115 may be utilized to interconnect the various realms, e.g., LANs 104, within the system 100. A WAN connection may allow two nodes 110 that are separated by a relatively long distance to communicate with each other. For example, in one embodiment a WAN connection 115 may connect two nodes 110 that are separated by 1 km or more. (WAN connections 115 may also be used to interconnect two nodes 110 in different realms or LANs, where the two nodes 110 are separated by a distance of less than 1 km.) In one embodiment, the data transfer rate via a WAN connection 115 may be relatively slower than the data transfer rate via a LAN connection 114. In various embodiments, a WAN connection 115 may be implemented in various ways. A typical WAN connection may be implemented using bridges, routers, telephony equipment, or other devices.

It is noted that FIG. 4 illustrates a simple exemplary system 100. In various embodiments, the system 100 may include any number of realms or LANs 104, and each realm or LAN 104 may include any number of nodes 110. Also, although FIG. 4 illustrates an example in which a single node from each realm is connected to a single node of each of the other realms, in various embodiments, various numbers of WAN connections 115 may be utilized to interconnect two realms or LANs. For example, a first node in a first realm may be connected to both a second node and a third node in a second realm. As another example, a first node in a first realm may be connected to a second node in a second realm, as well as a third node in the first realm being connected to a fourth node in the second realm.

As described above, a file (or other type of data object) on any given node may be stored on the node as a replica of the file (or data object). In one embodiment, each node that creates a replica of a file or data object may create a location-independent address associated with the replica, where the location-independent address represents the replica. A location-independent address that represents the replicas of a data object on one or more nodes may allow other nodes to send messages to the particular nodes that have the replicas without knowing which nodes those are. For example, a first node may send a message to one or more other nodes, where the one or more other nodes have replicas of the data object, and where the first node does not know that the particular nodes that have replicas of the data object are the one or more other nodes. The first node may simply address the message to the location-independent address that represents the replicas of the data object.

In one embodiment, the location-independent addresses that represent replicas may comprise roles. Role-based message addressing is described below. In one embodiment, types of replicas for a data object may vary, and each type of replica may be represented by a different role. As described below, in one embodiment the type of replica for a given data object on a given node may change over time. Thus, the role representing the replica may be replaced with a different type of role when such a change occurs. In one embodiment, four types of roles may be utilized. A glossary including brief descriptions of the four types of roles and related concepts follows. A more detailed description of the use of these roles to maintain coherency for data object replicas (and more details) follows the glossary. Terms in the glossary are also further explained in this more detailed description.

GLOSSARY

P-role—This role indicates a primary and persistent replica. This is also a conflict-resolver role. A replica that has asserted the P-role is called a P-replica. P-replicas may also be in charge of detecting all conflicts caused by updates to different W-replicas (described below) in different realms. In one embodiment a replica cannot assert the P-role unless it already has the W-role. To ensure that the P-role does not become a single point of failure, a realm may be required to have N(P) nodes that assert the P-role. In one embodiment, each of the N(P) nodes may assert the P-role simultaneously. In one embodiment, a replica that asserts the P-role cannot be deleted to re-claim space.

N(P)—This is the number of replicas of an object that the system must maintain in a realm in order to be able to assert the P-role in that realm. If the number of P-replicas falls below a quorum of N(P) (e.g., due to temporary node failures), then all conflict detection/resolution activity for this object in the entire system may be suspended until a quorum can be established again. No replica updates may be propagated outside the local realm (i.e., the realm where the updates were applied) until a quorum of P-replicas is re-established. If the number of P-replicas falls below N(P) due to a permanent failure, the system may detect this and create a new P-replica in that realm.

W-role—This role is asserted by a replica of an object if the replica is an updateable replica, i.e., a replica that can receive and apply data updates. A replica that has asserted the W-role is called a W-replica. In one embodiment, the presence of a W-replica of an object in a realm allows that object to be updated locally without requiring any inter-realm messages before returning success to the client application software. In one embodiment, the W-role can only be asserted by a node in a given realm if there are N(W) nodes in the realm that have instances of the W-role. The system may guarantee that updates made to a W-replica are made persistent on at least a quorum of the N(W) instances before returning success to the client application software. A W-role does not necessarily indicate persistency. A W-role can be removed if all the corresponding updates have been accepted by the P-replicas and made permanent. Removal of a W-role will normally involve removal of all the W-roles in that realm. In one embodiment, the W-role subsumes the R-role. In other words, an object that asserts the W-role also asserts the R-role.

N(W)—This is the number of replicas of an object that the system must maintain in a realm in order to be able to assert the W-role in that realm. In one embodiment, if the number of W-replicas falls below a quorum of N(W) (e.g., due to temporary node failures), then the object cannot be updated in this realm. If the number of W-replicas falls below N(W) due to a permanent failure, the system may detect this and create a new W-replica in the realm. If it is not possible to create a new W-replica in the realm, all the other W-replicas in this realm may give up their W-role.

R-role—This role is asserted by a replica of an object if the replica is a read-only cached copy of the object. A replica that has asserted the R-role but is not a W-replica is called an R-replica. The presence of an R-role of an object in a realm allows that object to be read locally without requiring an inter-realm message to be sent. However, all update requests received may be forwarded to the nearest W-replica. In one embodiment, a replica having the R-role might lag behind the latest version of the object because the replica receives updates asynchronously from the P-replicas.

S-role—This role is asserted by a replica of an object if the replica is a stale read-only cached copy of the object. A replica that has asserted the S-role is called an S-replica. In one embodiment, when an R-replica receives an invalidate message from a P-replica, the R-replica may downgrade itself to an S-replica. Thus, the R-role on the respective node may be replaced by an S-role. The S-role may later be converted back to an R-role when the node pulls the latest copy of the object data from a P-replica.

P-realm—A P-realm for a given object has the P-replicas of the object. In one embodiment, for any given object or file, there can be just one P-realm for the object. The P-realm performs the same responsibilities as a W-realm (described below), with the added responsibility of detecting and resolving conflicts in updates made in different W-realms in the system. All updates made in any W-realm are sent to the P-realm. Updates (or invalidate messages) may be broadcast from the P-realm to the other realms in the system. It is noted that different objects may have different P-realms. Thus, although there is only a single P-realm for any given object, multiple realms in the system may act as P-realms (for different objects).

W-realm—A W-realm for a given object has W-replicas of the object. This means that both read as well as update requests originating in this realm can be serviced locally (with low latency). The updates may also be sent to the P-replicas, e.g., may be sent asynchronously. If a network partition isolates this W-realm from other realms, replicas in the W-realm may still be read as well as updated locally. However, as long as the P-replicas are not reachable from this W-realm, the updates will not be visible anywhere else in the system. The updates will continue to be visible in this W-realm. There can be more than one W-realm for a given object. Each W-realm may accept updates independently of the other W-realms. The system may automatically detect and resolve conflicts caused by simultaneous updates.

Remote-realm—A remote realm for a given object does not have any replicas of the object at all. All requests for this object, e.g., read requests as well as update requests, may be forwarded to other realms. If a network partition isolates a remote realm from other realms, the object may be inaccessible in the remote realm.

Local updates log—This is a log of recent local updates that is maintained by each W-replica. In one embodiment, the local updates log only contains updates directly made to the W-replica. For example, the local updates log may not contain updates that were forwarded to the W-replica by a P-replica. Log entries from this log may be removed once a P-replica has acknowledged that the corresponding update has been accepted and applied by the P-replica. A non-empty local updates log indicates that there have been local updates at the site of this W-replica that have probably not yet been confirmed by the P-replicas.

Recent updates log—This is a log of recent updates that is maintained by each P-replica. This contains all the recent updates that have been forwarded to the P-replica by a W-replica. An entry from this log can be removed once the P-replica receives a message from the W-replica indicating that the W-replica has removed the corresponding entry from its local updates log.

Log Sequence Number (LSN)—This is a sequence number given to each log entry in a local updates log or a recent updates log.

Confirmed version number—All replicas in the system may have a confirmed version number. The confirmed version number represents the version number of the last confirmed update that was applied to this replica. This version number is incremented by P-replicas when applying an update, and is then broadcast to all the other replicas.

Local version number—A W-replica can have a local version number in addition to the confirmed version number. The local version number is incremented whenever a local update is applied to the W-replica. This represents an update that has not yet been confirmed by the P-replicas. As an optimization, the LSN of the local updates log may be used as the local version number.

Quorum version number—A replica that has a role with quorum semantics is required to have a corresponding quorum version number. Specifically, W-replicas and P-replicas are required to have a quorum version number. In case of permanent failures, when a new replica needs to get created, this quorum version number is updated as described below.

Figure 5:
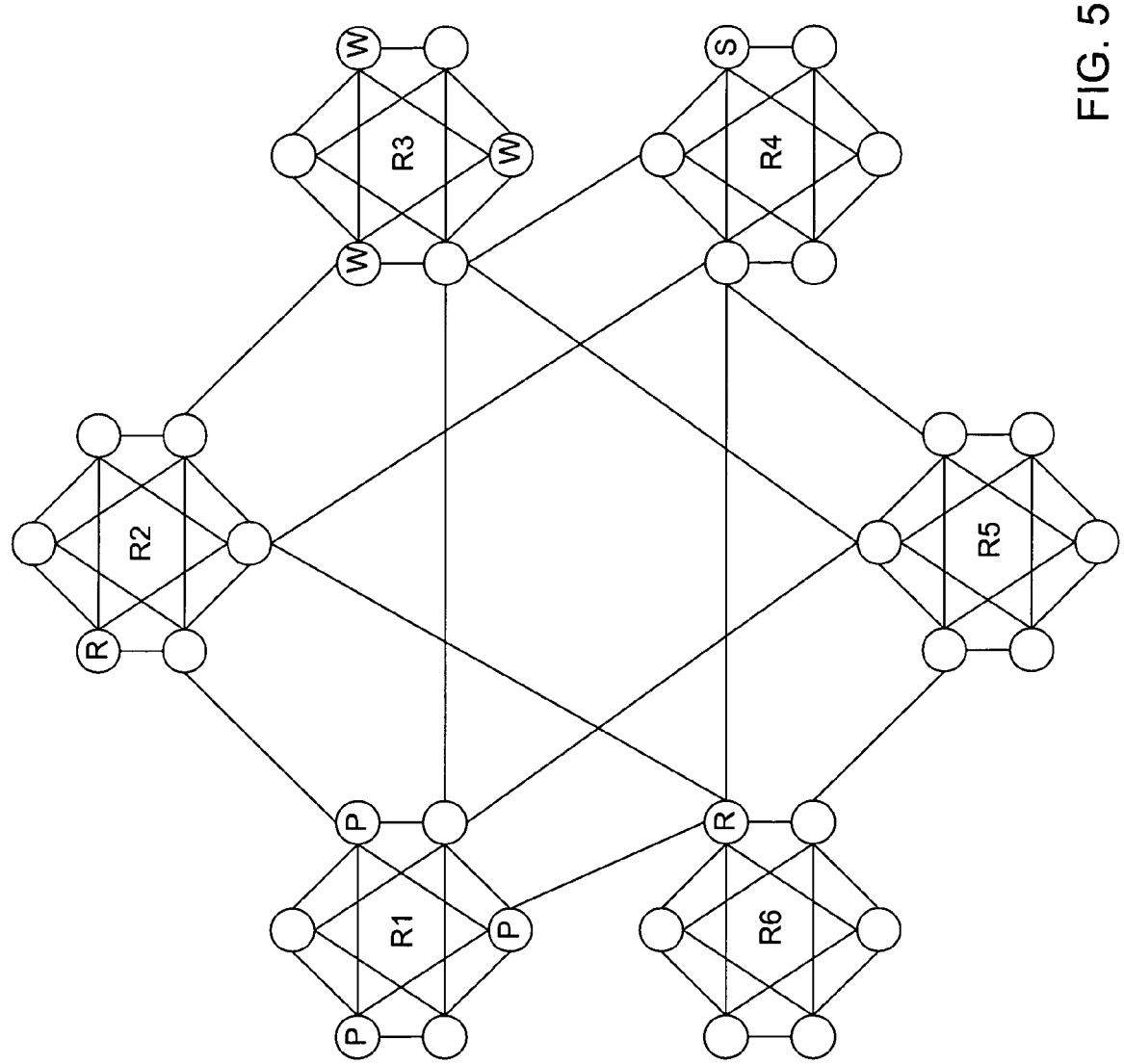
FIG. 5 illustrates an exemplary embodiment of the system in which four types of data object replicas are utilized.

Referring now to FIG. 5, a diagram illustrating an exemplary embodiment of the system 100 is shown. In this embodiment, the system 100 includes six realms, R1-R6. Links between nodes (represented by circles) in each realm are shown as lines connecting the respective nodes. Various inter-realm links are also illustrated.

The system may include a data object or file A. FIG. 5 illustrates several exemplary replicas of the data object or file A. Each node that has a replica is labeled with a corresponding letter indicating the type of replica. A P-replica is labeled with the letter "P", a W-replica is labeled with the letter "W", an R-replica is labeled with the letter "R", and an S-replica is labeled with the letter "S". As shown, realm R1 includes three P-replicas (i.e., includes three nodes that have P-replicas of the data object A). Realm R2 includes an R-replica. Realm R3 includes three W-replicas. Realm R4 includes an S-replica. Realm R5 is a remote realm with respect to the data object A, i.e., does not have any replicas of the data object A. Realm R6 includes an R-replica.

As described above, the W-role indicates that the associated replica is updatable. Multiple realms are allowed to have replicas with the W-role. However each realm that has a W-replica may be required to maintain N(W) W-replicas. For example, in the exemplary system of FIG. 5, N(W) may be 3. In one embodiment, updates can only be performed in a realm that has a W-replica. A quorum of the N(W) replicas present in that realm must be updated synchronously before success is returned to the client application software. Updates initiated by nodes in other realms that do not have a W-replica may be forwarded to the nearest W-realm.

One set of W-replicas (i.e. all the W-replicas in one particular realm), also have the P-role, i.e., this set of W-replicas are also P-replicas. This indicates that these replicas are primary, persistent, and are responsible for detection and resolution of conflicts. Conflicts can occur due to independent updates that are done in different W-realms in the system. As described above, the system may maintain N(P) P-replicas. For example, in the exemplary system of FIG. 5, N(P) may be 3.

After a quorum, e.g., a majority, of W-replicas of a data object has been updated, the update may be asynchronously sent to the P-replicas of the respective object. If there have been no conflicting updates to this object from any other realm in the system, the update may be accepted and may be broadcast to the rest of the realms in the system. If there has been a conflict, e.g., an update independently performed in another realm, the conflict may be resolved, e.g., either by merging the two conflicting updates or rejecting one of the updates. A conflict resolution message may be sent back to the realm that originated the update.

An R-role indicates a read-only cached replica. Read requests received by an R-replica may be satisfied locally, i.e., may not involve any inter-realm message communication. Update requests in a realm that has only R-replicas may be forwarded to the nearest W-replica. In one embodiment, an R-replica is not persistent and can be deleted at any time to re-claim disk space.

In one embodiment, after a successful update to a P-replica, an update packet or message may be broadcast from the P-realm to all R-replicas and W-replicas. In one embodiment, the update message may include all the necessary information to apply the update directly. In another embodiment, the update message may just include meta-data such as offset and length information. In this case, R-replicas can either update themselves immediately by pulling the changed data from the P-realm, or can invalidate themselves by un-publishing the R-role and publishing the S-role instead. If necessary, W-replicas can also invalidate themselves by un-publishing the W-role and publishing the S-role. However, this may be performed transactionally in that W-realm to ensure that all W-replicas reach a collective decision. In one embodiment, the update message may include all the necessary information to apply the update directly if the update was a small update, i.e., involved only a small data change, and the update message may include just meta-data if the update was a large update.

If an S-replica later synchronizes itself from a P-replica by pulling the latest version of the data, the S-replica can upgrade itself to an R-replica by un-publishing the S-role and publishing the R-role.

In one embodiment, updates may be logged using intent logging. Each W-replica and P-replica may maintain some logs of recent updates. These log entries may be used for propagating updates from one replica to another.

Version numbers may be used to detect conflicting updates. If a conflict is detected, the corresponding update log entries may be used to determine the exact updates that are in conflict and to determine how to resolve the conflict. In one embodiment, three different types of version numbers may be used in the system. A confirmed version number may be present in all replicas throughout the system and represents the version number of the last confirmed update that has been applied to that replica. A local version number may be present in the W-replicas and represents local updates that have not yet been confirmed by the P-replicas. Quorum version numbers may also be maintained by W-replicas and P-replicas and are used to create new W- or P-replicas. Details are described in later sections.

Reading and Updating

In one embodiment, any data object in the system can be accessed for read as well as update from any node in the entire system. In the absence of failures such as node failures or network partitions, an access operation may be guaranteed to succeed. In the presence of failures, it is possible that the access might fail.

Figure 6:
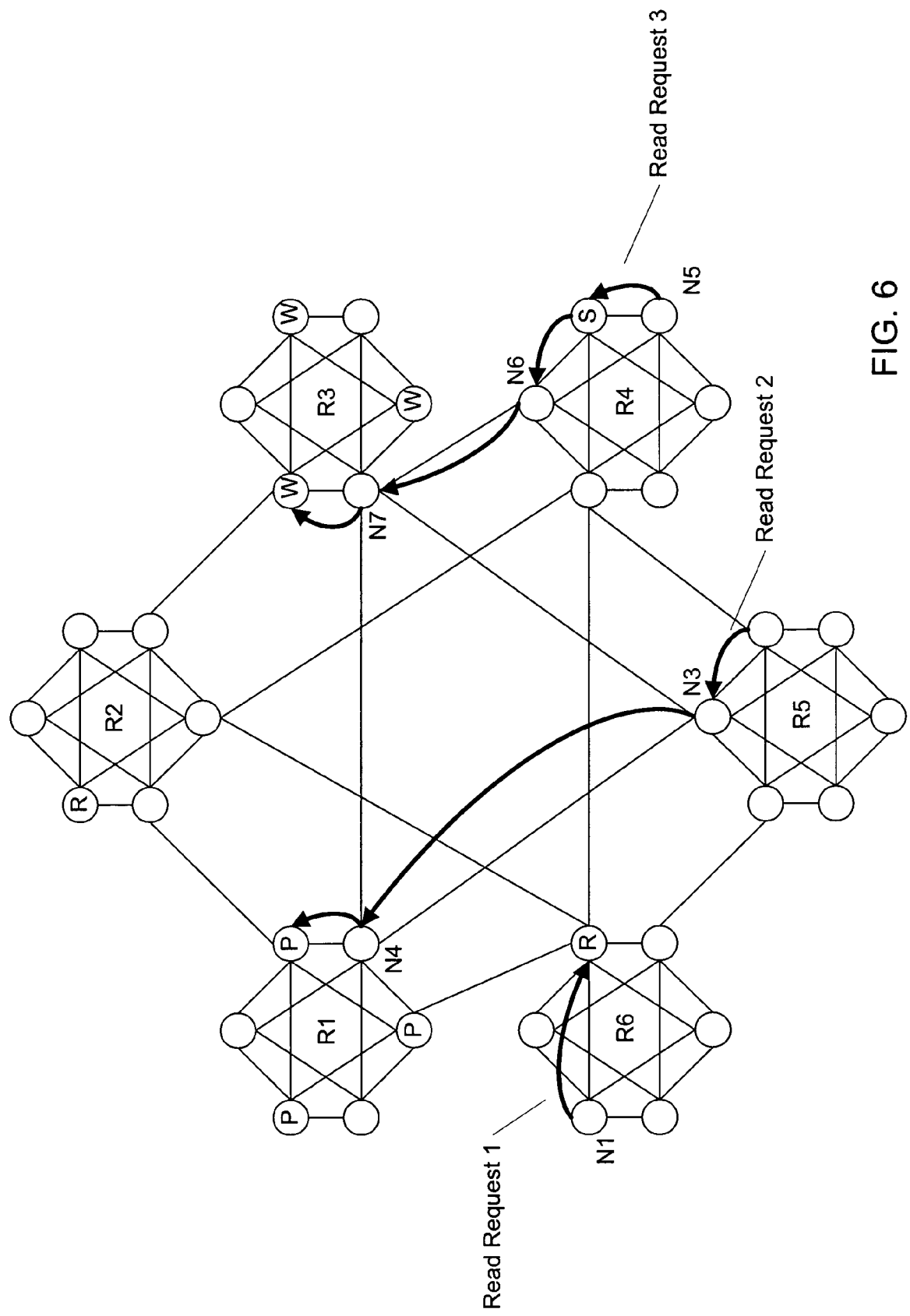
FIG. 6 illustrates a read request operation according to one embodiment.

FIG. 6 illustrates a read request according to one embodiment. A read request on any node may first be forwarded to a single instance of the R-role. For example, the T&R layer software 130 may provide a "sendOneInstance" API call for performing the send. The send may be performed with "nearest" and "LocalRealmOnly" semantics. This will find an R-replica, W-replica or a P-replica (because all of these types of replicas publish the R-role) within the local realm if one is reachable. In one embodiment, if the R-replica has recently forwarded an update to a W-replica but has not yet received a confirmation, the read request may be blocked until confirmation of the write is received, as described below.

In one embodiment, if no R-role is reachable locally, the read request may be forwarded to the nearest instance of the S-role within the local realm. The S-replica may accept the request and re-send the message to the R-role, but this time the send operation may be performed with system-wide scope, and the results may be channeled back to the original sender. If a system-wide read request sent from an S-replica to the R-role is not able to reach any instance of the R-role, the read request may fail.

The S-role may also keep track of the number of read requests that it has received recently. In one embodiment, when this number crosses some threshold, the S-replica may convert itself to an R-replica. Thus, channeling remote read requests through a local S-replica may be performed in order to collect statistics about the locally originating read requests. These statistics may be used to implement heuristics about when an R-replica needs to be created in the local realm.

If no instance of the S-role is found in the local realm, an S-replica may be created locally and then the read request may proceed as described above. The newly created S-replica may be empty, i.e., may not have any data. This is an example of a "partial replica". Partial replicas are described below.

FIG. 6 illustrates three exemplary read requests. Read request 1 (indicated as a bold arrow) may be initiated by node N1 in realm R6. As shown, the read request may be sent to the node in realm R6 that has the R-replica, and this R-replica may satisfy the read request.

Read request 2 may be initiated by node N2 in realm R5. As shown, the read request in this example may be propagated from node N2 to node N3 in realm R5, and from node N3 to node N4 in realm R1. (As described above, an empty S-replica may also be created in realm R5, although this operation is not shown.) Node N4 may propagate the read request to a node with a P-replica in realm R1. (As noted above, the P-replicas also have the R-role.) The node with the P-replica may satisfy the read request.

Read request 3 may be initiated by node N5 in realm R4. As shown, the read request in this example may be propagated from node N5 to the node with the S-replica in R4, and from this node to node N6 in realm R4. Node N6 may propagate the read request to node N7 in realm R3. Node N7 may propagate the read request to a node with a W-replica in realm R3. (As noted above, the W-replicas also have the R-role.) The node with the W-replica may satisfy the read request.

In other embodiments, a read request may be performed in other ways. For example, a read request may be satisfied from an S-replica if the S-replica happens to have the requested data. This would be faster, but returns stale data. In one embodiment, the client application that initiates the read request may specify whether stale data is acceptable or not. As another example, read requests may be satisfied by P-replicas. This may be relatively slower but may provide high probability of latest data. In another embodiment, read requests may be satisfied by a quorum of P-replicas. This may be even slower but may guarantee the latest data to be read.

Figure 7:
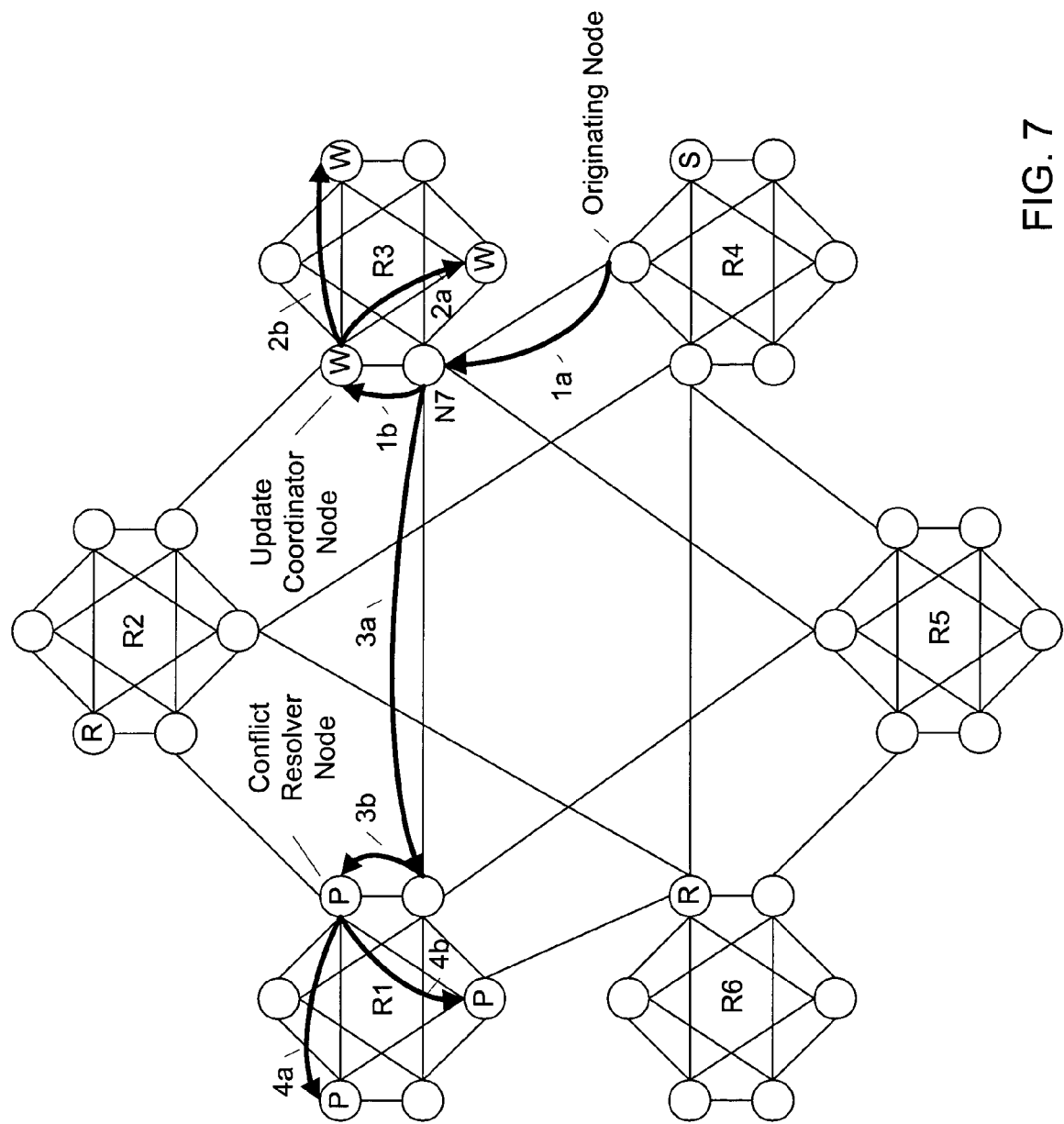
FIG. 7 illustrates an update request according to one embodiment.

FIG. 7 illustrates an update request according to one embodiment. An update request operation may proceed in a number of steps. The following terms provide an overview of an update request operation according to one embodiment:

Originating node: This is the node where the update request originates. It forwards the request to the nearest R-replica node.

R-replica node: This node just forwards the request received from the originating node to the nearest W-replica, referred to as the update coordinator node. Reasons for channeling the update request through the R-replica are discussed below. In FIG. 7, arrows 1a and 1b indicate the update request being sent from the originating node to the update coordinator node. (For simplicity of the diagram, the channeling of the update request through the R-replica is not shown.)

Update coordinator node: This is the W-replica node that receives the request forwarded by the R-replica node. The update coordinator node utilizes a distributed transaction to synchronously update all the W-replicas in that realm, as indicated by arrows 2a and 2b in FIG. 7. After the transaction succeeds, the update coordinator node forwards an update package or message to the P-replicas, as indicated by arrows 3a and 3b in FIG. 7. (In this example, the update message is propagated from the update coordinator node to node N7, and node N7 forward the update message to the P-realm.) In one embodiment, the update message may be forwarded by the update coordinator node to the P-replicas asynchronously so that the client application software that initiated the update request may receive a faster response.

Conflict resolver node: This is the P-replica node that receives the update message from the update coordinator node. The conflict resolver node detects whether there have been any conflicting updates to the same data object from elsewhere in the system. If so, the conflicts may be resolved. The conflict resolver node may utilize a distributed transaction to update all the P-replicas in the P-realm, as indicated by arrows 4a and 4b in FIG. 7. The conflict resolver node may also broadcast the (conflict-resolved) update message to all the nodes in the system that have the R-role. This results in all the W-replicas as well as the R-replicas receiving the update message, since the W-replicas publish the R-role. (For simplicity of the diagram, the broadcast of the update message to all the nodes that have the R-role is not shown.)

R-replica and W-replica nodes: These nodes receive the update message from the conflict resolver node. Each of the nodes may either apply the update locally or invalidate its replica by downgrading to an S-role.

Details of one embodiment of the algorithms that execute on each of the above nodes are described below.

As described above, the originating node may forward the update request to the nearest R-replica instead of the nearest W-replica. One reason for channeling an update request through the R-replica is so that the R-replica can keep track of the number of update requests received, and can thus use heuristics to determine when it is time for a set of W-replicas to be created locally.

Also, consider a client application that does an update followed immediately by a read. If the update were sent directly to a W-role and the read were sent to an R-role then it is quite likely that the read and write (update) are serviced by different replicas. In this case, it is very likely that the R-replica that services the read request has not yet received the update or invalidate message from the P-replica corresponding to the previous update operation. Hence, the client application will not see its own writes. In an embodiment of the system that has a large number of R-replicas but relatively fewer W-replicas, the probability of this anomalous behavior may be rather high even without any failures or network partitions in the system. In this case, channeling the writes (updates) through the R-replica allows the R-replica to block the next read until the confirmation for the write arrives. Thus the client has a much better probability of seeing its own writes. It is noted that in one embodiment, this behavior may not be guaranteed because it is always possible that the read request might go to a different R-replica than the previous write request (update request). However, in the absence of failures or network partitions the probability of this happening may be low.

Conflict Detection and Resolution

It is possible that a P-replica might receive an update message from a W-replica whose confirmed version number is lower than the confirmed version number of the P-replica. This indicates that the P-replica has accepted an update from another W-replica while the first W-replica was being updated. This represents concurrent conflicting updates to the same data object. In this case, the system may try to automatically resolve the conflicts using standard techniques found in distributed file system literature. It is noted that the system has the exact details of all the updates that might be in conflict. Specifically, the incoming update message includes details of the latest update that causes the conflict. In addition, all the entries in the recent updates log of the P-replica with a confirmed version number greater than the confirmed version number of the incoming update message represent updates that are in conflict with the incoming update. The system can analyze these logs and utilize techniques or heuristics to determine how to resolve the conflicts.

After determining the conflict resolution, a new pseudo-update message that indicates how the two updates are resolved may be created. This pseudo-update may be applied to the P-replicas. This creates a new confirmed version number corresponding to the conflict-resolving pseudo-update. Then a conflict resolution message including this pseudo-update may be broadcast to all the replicas in the system. Each replica may apply the pseudo-update locally.

In a typical system, the occurrence of conflicting updates may be a rare event. Also, most conflicts that occur may be automatically resolved. In rare cases where conflicts cannot be automatically resolved, one of the versions may be heuristically chosen as the confirmed version. The other version may be available to the user (or other software application), e.g., may be available in a conflict bin.

Keeping W-Replicas in Sync

Two W-replicas are said to be out of sync if their version numbers (quorum, confirmed, or local) do not match. In one embodiment, these can be brought in sync as follows:

If their quorum version numbers do not match, the W-replica with the lower quorum version number may be deleted (or downgraded to an R-replica).

If their confirmed version numbers do not match, the lagging W-replica may update itself by contacting a P-replica and requesting the latest updates. The P-replica may respond by sending all the update log entries (from the recent updates log) corresponding to a confirmed version number greater than the given version number. This refers to an embodiment in which the W-replica may not be able to get this information from its fellow W-replicas because they do not have the necessary logs. In another embodiment, optimizations may be implemented so that the W-replicas retain the necessary information for some amount of time, and then lagging W-replicas can update themselves by just contacting their peers.

If their local version numbers do not match, the lagging W-replica may update itself by requesting the latest local updates from the other W-replica. The more up-to-date W-replica may respond by sending all the log entries from the local updates log that correspond to a local version number greater than the local version number of the lagging replica.

Similar techniques as those described above may be used to bring two P-replicas into sync.

Maintaining the Number of Replicas

Replicas can become unavailable due to two reasons: node failure and network partitioning. In general, temporary failures (e.g., network partitions and temporary node failures) do not have much effect on the system because the system has enough redundancy to be able to continue operations in the face of common types of failures and has the ability to seamlessly resolve any inconsistencies and conflicts arising out of such failures.

However, permanent node failures do affect the system. When a node fails, all the replicas on that node are gone. This results in reduced availability of the corresponding data objects. As long as a quorum of those data object replicas is still available, the system can continue functioning without impairment. However, permanent failures increase the probability that temporary failures will result in quorums not being available for some of these data objects.

The algorithms described herein depend upon a quorum of W-replicas or P-replicas being available. Some operations may fail if a quorum is not available. Thus, the system may be operable to keep the number of W-replicas as close to N(W) as possible and the number of P-replicas as close to N(P) as possible.

Consider a W-replica that has become permanently unavailable due to a node failure. Once the system detects this, it may create a new W-replica on another node to take its place. However, the system can never be completely sure whether a failure is permanent or temporary, and hence may also be operable to handle an old W-replica coming back to life after this point. If care is not taken, this can result in the number of W-replicas going over N(W). And if this situation is not detected, it can result in breaking of quorum guarantees. For example, if the system believes that N(W) is 3, but the actual number of W replicas is 5, then it can commit a transaction with just two W-replicas, even though these two no longer represent a majority of the W-replicas that are available.

To prevent such problems a quorum version number may be stored persistently with each W-replica. This is initialized to 0 when a new data object replica is created. Whenever (through any of various heuristics) the system determines that some W-replicas have failed permanently, the system may start a distributed transaction to create new W-replicas. In one embodiment, this transaction may only complete successfully if a quorum of W-replicas can still be reached. As a part of this transaction, new W-replicas may be created on new nodes so that the total number of W-replicas becomes N(W) again, and the quorum version number may be incremented on all the W-replicas. This new quorum number may also be stamped upon the newly created W-replicas. This completes the transaction.

After this point, if a W-replica that was believed to be dead comes back to life, this old W-replica will notice during conflict detection/resolution that it has an older quorum version number. In such a case, the old W-replica may delete itself or downgrade itself to an R-replica or S-replica as appropriate.

The following points are noted:
— If a version mismatch is detected among the reachable W-replicas at the start of the transaction, the conflict resolution algorithm may execute to bring them in sync before the transaction can proceed.

Split-brain conditions are not possible in this scenario because of the use of quorum. At any given time, as long as a quorum is reachable, there is no doubt as to whether a particular W-replica is valid (i.e., part of the latest set of W-replicas) or invalid (i.e., presumed dead and voted out by its peers).

A W-replica that determines that it is invalid can safely delete itself (or downgrade itself to be an S-replica) without worrying about loss of data. This is because there is a guarantee that any updates that were made on this replica were propagated to at least one of the replicas that formed part of the new quorum.

It is possible that an invalid W-replica might service some read requests and return stale data before it determines that it is an invalid W-replica. This would be exactly equivalent to the semantics of an S-replica or R-replica that missed an invalidate message.

Restoring Coherency

As described above, to ensure performance and availability in the presence of failures, it is necessary to allow an update to succeed on just a quorum or subset of the P-replicas and let the other P-replicas remain temporarily incoherent. A technique may then be applied to update the lagging replicas and restore coherency. One embodiment of such a technique that is efficient and resilient to failures is described in this section.

According to one embodiment, each node may maintain a list of files or other data objects known to be incoherent. When an update is made to the P-replicas of an object, if all P-replicas of that object were not reachable during the update, then the ID of the object is added to the list of incoherent objects on each of the nodes that did participate in the update. In one embodiment a background thread on each node may periodically scan the node's list of incoherent objects and try to communicate with all the P-replicas associated with the objects in the list. If all the P-replicas of an object are reachable then lagging P-replicas (those that missed recent updates) may be synchronized with the other P-replicas. In one embodiment the synchronization may be performed using a distributed transaction. The object may then be removed from the list of incoherent objects on all the concerned P-replica nodes, i.e., on all the P-replica nodes that participated in the update missed by the previously lagging P-replica nodes.

If an object remains in the list of incoherent objects for a very long time, then it is assumed that one or more nodes with P-replicas of the object have failed permanently. In this case, an appropriate number of new P-replicas of the object may be created and populated with data from the existing reachable P-replicas. As described above, a version number mechanism may be used to ensure that if nodes having the old P-replicas come back to life, the older P-replicas will be recognized as obsolete and deleted.

In one embodiment, additions to the list of incoherent objects are not made persistent immediately. Doing so would require a disk access and would thus increase the latency associated with every update request, as seen by the client application. Instead, the list may be written to persistent storage only periodically. If a node crashes before the list of incoherent objects can be made persistent, recent additions to the list may be lost. However, this information is not completely lost unless all the other nodes on which the additions were made also crash. The probability of that happening is very low. In the unlikely event that some information is lost due to multiple failures, a "last coherent" timestamp mechanism (described below) still ensures that the lagging P-replicas get updated eventually.

Figure 8:
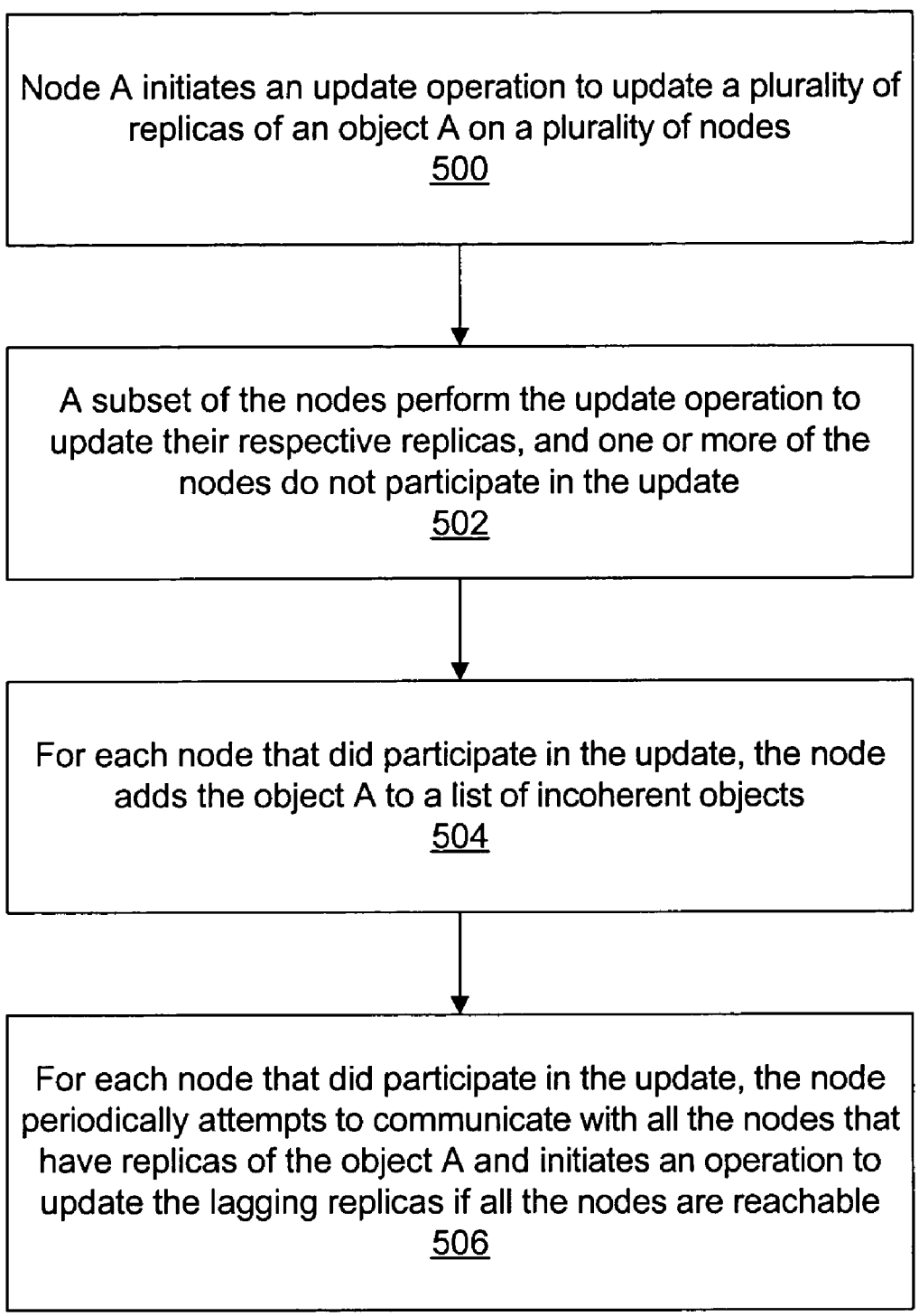
FIG. 8 is a flowchart diagram illustrating one embodiment of a method for restoring coherency among a plurality of replicas.

FIG. 8 is a flowchart diagram illustrating one embodiment of a method for restoring coherency among a group of replicas as described above. It is noted that FIG. 8 illustrates a representative embodiment, and alternative embodiments are contemplated.

As shown in 500, a node A may initiate an update operation to update a plurality of replicas of an object A. Each of a plurality of nodes may store a replica of the object A. Performing the update operation may involve attempting to communicate with each of the plurality of nodes so that the node can update its respective replica. However, as described above, one or more of the nodes may not be reachable.

Thus, as shown in 502 a subset of the nodes may perform the update operation to update their respective replicas, but one or more of the nodes may not participate in the update. For example, in one embodiment a quorum of the nodes (but not all of the nodes) may participate in the update.

Each node that did participate in the update may add the object A to a list of incoherent objects, as described above and indicated in 504.

Each node that did participate in the update may periodically attempt to communicate with all the nodes that have replicas of the object A. If one of the nodes determines that all the other nodes are reachable, the node may initiate an operation to update the lagging replicas, as described above and indicated in 506.

It is possible that asynchronous update request messages that are forwarded to the replicas with R-roles might get lost, e.g., due to node failures or network failures. This may result in one or more R-replicas having stale data. Requiring an R-replica to validate itself with a P-replica before satisfying every read access would result in high latencies for reads, especially if the P-replicas happen to be across a WAN link. This would also reduce availability when the P-replicas are not reachable.

Instead in one embodiment, every replica (R-replicas as well as P-replicas) may have a "last coherent" timestamp stored persistently with the replica metadata. For R-replicas, the last coherent timestamp may be updated whenever the R-replica receives a valid update message from a P-replica. For P-replicas, the last coherent timestamp may be updated whenever the P-replica participates in an update transaction. On every read access the last coherent timestamp may be checked to see if the time elapsed since then exceeds a threshold amount referred to as the maximum replica lag. If the time elapsed does not exceed the maximum replica lag then the read request may be satisfied locally.

If the time elapsed does exceed the maximum replica lag then a message may be sent to the P-replicas of the file or data object to determine whether there have been any recent updates that this replica missed. If such updates are found then the corresponding data may be fetched, and the updates may be applied locally before performing the read operation. The last coherent timestamp may be updated to be the current time, thus indicating that the replica was known to be coherent at that time. The last coherent timestamp may be updated even if no new updates are found. It is possible that due to node or network failures, no other P-replicas are reachable. In this case, the last coherent timestamp may not be updated. The read may be performed locally, but a warning may be written to administrator log records.

Figure 9:
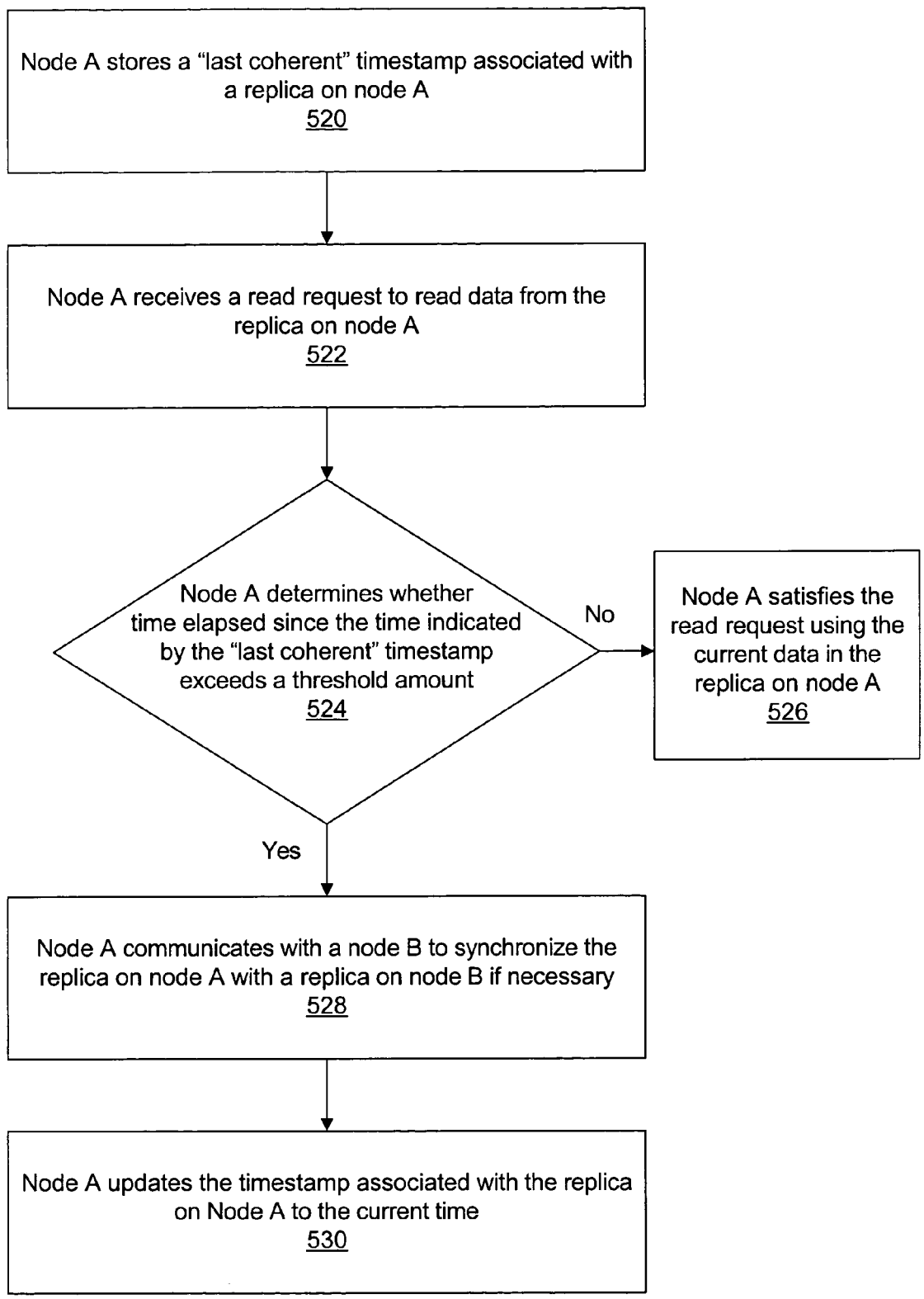
FIG. 9 is a flowchart diagram illustrating one embodiment of a method for ensuring that a first replica is coherent with respect to a second replica.

FIG. 9 is a flowchart diagram illustrating one embodiment of a method for ensuring that a first replica is coherent with respect to a second replica as described above. It is noted that FIG. 9 illustrates a representative embodiment, and alternative embodiments are contemplated.

As indicated in 520, a node A may store a "last coherent" timestamp associated with a replica on node A.

In 522, node A may receive a read request to read data from the replica on node A.

In 524, node A may determine whether the time elapsed since the time indicated by the "last coherent" timestamp exceeds a "maximum replica lag" threshold amount, as described above.

If the time elapsed does not exceed the threshold amount, node A may satisfy the read request using the current data in the replica on node A, as indicated in 526.

Otherwise, node A may communicate with a node B to synchronize the replica on node A with a replica on node B if necessary, as described above and indicated in 528. Node A may also update the "last coherent" timestamp associated with the replica on Node A to the current time, as indicated in 530.

Replica Creation

The description above discussed the various kinds of replicas (W, P, R, and S) existing in the system 100 according to one embodiment. This section provides an overview of how and when some of these replicas can be created. It is noted that many alternative heuristics or techniques are contemplated for determining when various types of replicas should be created and for selecting the nodes on which to create the replicas. This section describes exemplary possibilities. To facilitate these heuristics, various statistics may be maintained at different nodes in the system.

In general P-replicas are minimum requirements for long-term existence and health of a data object. N(P) P-replicas of an object may be created at the time of object creation, and the system may try to ensure that N(P) P-replicas are always alive. All these P-replicas are constrained to be within the same realm. Various heuristics are possible for determining the realm and the nodes on which to create the P-replicas. For example, possibilities include:
  Realm in which the create request originated
  Realm in which the P-replicas of the parent object (directory) of this object are located
  Nodes that have maximum free space
  Nodes on which W-replicas of the parent object (directory) are located It is possible for an object to exist and function properly with just P-replicas. All read as well as write requests get forwarded to the P-replicas. Latencies will be high, and the object will become unavailable if the P-realm is not reachable due to a network partition.

The system may automatically create an R-replica for a data object in a realm when a number of read requests have arrived in some amount or window of time. In one embodiment, the system may fetch all the data associated with the data object from a P-replica and may create a cached replica on a node in the realm, and the node may publish the R-role for that data object. From this point on, all read requests from this realm may get serviced by this R-replica, thus avoiding inter-realm latencies. All readers in this realm may see improved read performance. Updates still have to be sent to the P-replicas. Space occupied by R-replicas that have not been used recently can be reclaimed when necessary by using least-recently-used (LRU) semantics. This ensures that R-replicas do not over-proliferate in the system.

If the system sees a number of update requests for an object in some amount or window of time from a realm that does not have any W-replicas for the object, the system may decide to create W-replicas in the realm locally. Let us assume that the realm already has an R-replica. In this case, new R-replicas may be created within the realm so that the total number of replicas in the realm becomes N(W). In the context of a distributed transaction, all the R-replicas may then assert the W-role to become W-replicas. At this point, their local version numbers may be initialized to 0, and the local updates log is empty.

In another embodiment, W-replicas may be created if an update request arrives in a realm that cannot reach any W-replicas (due to network partitioning), but does have access to an R-replica. In that case, W-replicas can be created using the R-replica, as described in the previous paragraph.

The algorithm described below for a W-replica to respond to an update message received from a P-replica can be modified so that when an update message is received by a W-replica and the W-replica notices that it has not seen any local update activity in a long time, it can delete itself. This ensures that W-replicas do not overrun the system. Note that a W-replica can only delete itself if it does not have the P-role and if its local update log is empty. Also, dropping a W-role may be performed transactionally, i.e., each of the N(W) W-replicas in a realm may drop their W-role together. One of the W-replicas can also choose to just downgrade itself to an R-replica instead of deleting itself, if appropriate.

In one embodiment, the system may be operable to determine a situation in which a large number of updates are originating in a particular W-realm, while not much update activity is being initiated in the P-realm. In this case, the system may be operable to migrate the P-replicas from the current P-realm to the W-realm. Migrating the P-replicas is a heavyweight operation. The system may first ensure that the W-replicas in the W-realm are up-to-date (i.e., local updates log is empty, and the confirmed version number matches the version number in the P-realm). If N(P)>N(W), then new W-replicas may be created in the W-realm to bring the number up to N(P). The recent update logs maintained by the P-replicas may also be migrated to the W-replicas. After all this is done, the P-role can be migrated. These operations may occur in the context of a distributed transaction.

Scope of Role Publish Operations

In one embodiment, P-, W- and R-roles are published with system-wide scope, and S-roles are published with realm scope. P-, W- and R-roles may be published with system-wide scope for the following reasons. P- and W-replicas should be visible throughout the system so that they can be accessed from other realms that do updates. R-roles may be published with system-wide scope so that P-replicas can push update or invalidate messages to them.

Distributed Transactions

The description above refers to various operations that are performed using distributed transactions. In one embodiment, the implementation of a distributed transaction may give the following quorum-or-nothing semantics.

Consider k different data objects that participate in a single transaction. Each data object has a number of W-replicas. The number of replicas is known beforehand. Each data object may have a different number of replicas, e.g., N(W) may be different for different data objects. In this case, if the distributed transaction returns success, then the update is guaranteed to have succeeded on a quorum of W-replicas for each of the k data objects. If the transaction returns failure, then the update is not visible on any replica of any of the k data objects.

Detailed Update Algorithm

This section provides detailed information for one embodiment of an update algorithm that operates in accordance with the description above. As described above, an update operation may involve various nodes, including an originating node, an update coordinator node, and a conflict resolver node, among others. Performing the update operation may involve executing algorithms on each of these nodes. A description of the algorithms that may operate on the various nodes is provided.

Originating Node Algorithm: In one embodiment, the following steps may be performed on the originating node.

Step 1.1: The update request is forwarded to an instance of the W-role (of one of the objects that participate in the transaction),e.g., using the sendOneInstance API call discussed above. This call may find a W-role in the local realm if one is reachable, or may cross realm boundaries to find a W-role in a different realm if necessary.

Step 1.2: If no W-replica can be reached, the update fails.

Step 1.3: Wait for a reply from the W-replica node (update co-ordinator node). In case of success, return success to the client application.

In case of an error, the entire procedure may be re-tried a small number of times before giving up. It is noted that in an alternative embodiment the originating node may channel the update request through an R-replica node, as described above.

Update Coordinator Node Algorithm

This is the W-replica node that receives the update request from the originating node. In case of multi-object transactions, this node has at least one of the W-replicas of one of the objects involved in the transactions. In one embodiment, the following steps may be performed on the update coordinator node.

Step 2.1: Start a distributed transaction to synchronously update one set of W-replicas for each data object participating in this update.

Step 2.2: If a quorum of W-replicas cannot be reached for each participating object, return an error to the originating node.

Step 2.3: If the W-replicas of any particular object reached in Step 2.1 are out-of-sync, bring them all in-sync by running the re-synchronization algorithm described above.

Step 2.4: If the update is a dependent update (i.e., it depends upon a previously read version of one of the objects involved in the update) then check the dependent version number(s) against the current version number(s) of the corresponding objects. If the version numbers do not match, the update fails with an error.

Step 2.5: Apply the update to all the W-replicas found in Step 2.1 using a distributed transaction. If the transaction fails, return an error to the originating node. If the transaction succeeds, return success. As a part of the transaction, the local version number is updated, and the intent log for this update is entered into the local updates log associated with each W-replica.

Step 2.6: After returning success to the originating node send an update message to one instance of the P-role of each object using the sendOneInstance API call. This may include the realm ID and node ID of the update coordinator node, the current confirmed version number of the W-replica, the local version number of the W-replica after the update, and the actual update data.

Conflict Resolver Node Algorithm

This is the P-replica node that receives an update message from an update coordinator node. In one embodiment, the following steps may be performed on the conflict resolver node.

Step 3.1: Check whether the same update has been received at this node before. (i.e., an update with the same confirmed version number and the same local version number). If yes, ignore the update and send an acknowledgement back to the sender.

Step 3.2: Check whether the confirmed version number of the incoming update matches the confirmed version number of the local replica. If not, find all entries in the recent updates log that have a version number higher than the version number of the incoming update. The following possibilities exist:

3.2.1: All updates identified above are from the same realm that sent this latest update. This, in fact, is not a conflict at all. It just means that an update was applied at the W-replica node before acknowledgement for the previous updates has come back to the W-replica from the P-replicas. In this case, the latest update is accepted.

3.2.2: The updates identified above contain one or more updates from a node other than the node that sent the current update. In this case, there is a real conflict. The conflict resolution algorithm may be initiated to check whether all these updates are compatible with each other. If they are compatible with each other, these updates are merged and appropriate updates are applied to the P-replicas. If non-resolvable updates are found, human intervention will be required. This may involve conflict-bins or other such methods.

3.2.3: It is possible that the P-replica has removed older entries from the recent updates log(to reclaim disk space used by the log). In that case it is possible that the oldest log entry in the recent updates log has a version number that exceeds the incoming version number by 2 or more. In this case, the file may be considered to be in non-resolvable conflict. Human intervention will be required.

Step 3.3: Check that previous update messages from this realm have not been lost. This can be done by comparing the local version number of the incoming message with the local version number of the previous update from this realm. In case of lost updates, return an error message indicating that the W-replica must re-send all its local updates and terminate this algorithm. (Various optimizations are possible to reduce the messaging involved in this step.)

Step 3.4: Start a distributed transaction to apply the update to all the P-replicas. As a part of this transaction the confirmed version number is incremented, and a log entry is added to the recent updates log associated with each P-replica.

Step 3.5: If the transaction fails, send an error message back to the update co-ordinator node.

Step 3.6: If the transaction succeeds, broadcast an update message to the R-role. This may include the new confirmed version number, the node ID of the update coordinator node, the local version number that was received from the update coordinator node, the intent log for the update, and the actual update data if it is small enough.

R- or W-replica Node Algorithm

After an update succeeds at the P-replica nodes, an update message may be sent to all the R-replicas and the W-replicas in the system. The following algorithm may be performed by the respective nodes on which the replicas are located:

Step 4.1: If the local replica happens to have the W-role and if the realm ID included in the update message matches, then it is assumed that this W-replica participated in the original transaction that did the update locally. In this case, the update does not need to be applied locally, so the algorithm terminates at this point. However, the algorithm below may be executed to clear out the local updates log. It is possible that this W-replica did not participate in the relevant transcation (because it was down or partitioned). In that case the re-synchronization algorithm will take care of eventually applying this update.

Step 4.2: If the local replica happens to have the W-role, and it has a non-empty local updates log, then ignore this update message. This is because there is a local update that conflicts with the update that has just arrived. Eventually the local update will get sent to the P-replicas and the conflict will get resolved by the P-replicas. The update will eventually reach this replica in the form of a conflict resolution message. The execution of this algorithm is terminated at this point.

Step 4.3: If the difference between the confirmed version number in the update message and the confirmed version number of the local replica is more than 1, this indicates that the local replica has missed a previous update message and is now stale. In that case, the local replica un-publishes the R-role, and publishes the S-role and this algorithm terminates.

Step 4.4: If the update data is contained within the update message, then the update is applied locally. If not, the local replica either pulls the data from a P-replica and applies it, or it downgrades itself to an S-role. (Note: even a W-replica can decide to downgrade itself, but this has to be done transactionally by involving all the W-replicas of this realm. Various heuristics may be utilized to determine when a W-replica decides to downgrade itself.)

Algorithm for Clearing the Local Updates Log

The following steps may be taken to remove entries from the local updates log of a W-replica. This algorithm is invoked from Step 4.1 as described above. This algorithm is involved only if the realm ID contained in an incoming update message matches the realm ID of the local node.

Step 5.1: If the confirmed version number of the local replica is greater than or equal to the confirmed version number in the update message, go directly to Step 5.3.

Step 5.2: Find all entries in the local updates log that have a local version number less than or equal to the local version number contained in the incoming update message. Delete all such entries. Proceed to Step 5.3 whether or not such entries were found in the local updates log.

Step 5.3: If the node ID contained in the incoming update message matches the local node ID, then send a LocalUpdateLogEntryRemoved message to the P-replicas. This message may include the node ID, realm ID of the local node and the local version number of the log entry that was just deleted.

Algorithm for Clearing the Recent Update Log

This algorithm may be performed by each P-replica when it receives a LocalUpdateLogEntryRemoved message from a W-replica.

Step 6.1: Find all log entries in the recent updates log that have the same realm ID as the incoming message, and a local version number less than or equal to the one in the incoming message. Mark them all as removable.

The recent updates log may be maintained as a circular log. Old entries may get deleted as new entries are created. Old entries can be removed only if they are marked as removable. If an entry is not removable, and the node needs to reclaim space for the log, human intervention is needed.

Partial Replicas

It is not necessary for an R-replica to always contain all the data of a file or other data object. In one embodiment, a replica at a given node may include only parts of the data of the file or data object. The replica may keep track of which data blocks are cached locally and which are not. In case a read request is for data that is entirely included within the blocks cached locally, the request can be satisfied locally. If not, the relevant blocks can be fetched from a P-replica and added to the local cache. After this the request can be satisfied locally.

This has the advantage that the initial reads of a file or other data object from a remote realm become much cheaper because the entire file does not have to be fetched before the read can be satisfied. In case there are applications that access only small parts of large files, this optimization could significantly reduce the network bandwidth used.

The disadvantage of this approach is that it reduces the availability of the data. In case the local replica does not have some parts of a file, and if a P-replica is not reachable due to network bandwidth, then the read request will fail.

Various heuristics may be used to determine when a partial replica should be created and when a replica should be a full replica. For example, in the case of small files, a full replica may be preferable. In the case of large files, initially a partial replica can be created, and then it can be dynamically converted to a full replica if the number of accesses to that replica crosses some threshold. It is noted that the W-replicas could also be partial replicas, and similar heuristics can be applied.

Message Addressing

In one embodiment nodes may store routing information for each file or data object indicating how to route messages to the various roles associated with the file. For example, in one embodiment each file or data object may have an associated tree. When performing a send operation to send a message to a role for a particular file or data object, a node may specify the ID of the tree on which to perform the send operation. In one embodiment, the ID of the tree associated with each file or data object may be the same as the ID of the file or data object. Thus, to send a message to a role for a particular file or data object, a node may need to know the ID of the file or data object.

In one embodiment, an application may utilize well-known IDs for various files or data objects so that each node knows the IDs for files or data objects it needs to access. In another embodiment, a node may possess other information regarding a file or data object such as its name or other meta-data and may utilize a global name space service to lookup the file or data object ID. The global name space service may provide a global mapping service that maps a human-readable name for each file or data object to the file or data object's ID. For example, in one embodiment each file or data object may have a hierarchical pathname in the form: $/p_0/p_1/p_2/ \ldots /p_{n-1}/p_n$, where each $p_i$ is a pathname component, and the global name space service may map the pathname to the file ID. In one embodiment, the global name space service may be designed to perform name lookups using only nodes in the local realm.

Role-Based Addressing

In the distributed file sharing model described above, nodes send various control messages to location-independent addresses associated with other nodes. For example, when a node wants to perform a write operation to a file, the node may send an update request message to a location-independent address associated with nodes that store writable replicas of the file. A location-independent address may comprise information usable to address a message without specifying where the message recipient is located in the network, e.g., without specifying a particular node in the network. Thus, using location-independent addresses allows messages to be sent from a sender node to one or more destination nodes without the sender node being required to know which specific nodes are the destination nodes. For example, a location-independent address may simply specify a property or entity that is associated with the destination nodes, and the message addressed to this address may be routed to each node that has the associated property or entity. As discussed above, one example of a location-independent address is a "role".

The T&R layer software 130 discussed above may include an interface allowing clients (e.g., the object layer software 129 and/or the client application software 128 discussed above) to utilize the T&R layer software. The T&R layer software 130 interface may allow clients to create a role on one or more nodes on a tree (more specifically, an instance of the role may be created on each of the one or more nodes). Each node on which an instance of the role is created is said to have the role or assert the role. In one embodiment, each role may be identified using a string, e.g., the name of the role, such as "P", "W", "R", etc. In other embodiments, roles may be identified in other ways, e.g., using integers.

Thus, a complete network address for sending a message may comprise information identifying a tree and a role on the tree. For example, in one embodiment the tree may be identified using a tree ID, such as a 128-bit Universally Unique ID (UUID), and a role may be identified using a variable length string. As discussed above, each file or data object may have an associated tree, where the tree ID is the same as the file or data object ID.

In another embodiment, a network address for sending a message may also include information identifying a portion of software to receive the message. For example, the network address may also include information identifying a protocol ID associated with software that utilizes the T&R layer. Multiple protocols may utilize the same tree. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node or which portion of software receives the message. In another embodiment there may not be multiple protocols, or a message may be sent without specifying a particular protocol ID. If no protocol ID is specified, the message may be delivered to all protocols bound to the tree.

Any semantic meaning associated with a role may be done so by higher-level software and not by the T&R layer. For example, roles such as "P" or "W" may appear to the T&R layer as just two different strings that each designate a separate target on a tree for message transfers. The T&R layer may treat client messages simply as a set of bytes.

Sending messages to roles instead of directly to nodes may have a number of advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable storage medium storing program instructions executable to implement a method comprising:
   storing a respective replica of an object on each respective node of a plurality of nodes;
   a first node of the plurality of nodes initiating a first distributed transaction to attempt to synchronously update the replicas of the object stored on each of other nodes of the plurality of nodes, wherein each respective node of a first subset of the other nodes successfully commits the first distributed transaction to update the replica of the object stored on the respective node, and wherein each node of a second subset of the other nodes does not successfully commit the first distributed transaction; and
   each respective node of the first subset of the other nodes adding an identification of the object to a respective list of incoherent objects stored on the respective node in response to determining that not all of the other nodes successfully committed the first distributed transaction;
   wherein the first subset of the other nodes includes a second node of the plurality of nodes;
   wherein the method implemented by the program instructions further comprises:
      after the second node adds the identification of the object to the respective list of incoherent objects stored on the second node, the second node attempting to communicate with each of the plurality of nodes other than the second node; and
      in response to successfully communicating with each of the plurality of nodes other than the second node, the second node initiating a second distributed transaction to synchronize the replicas stored on the second subset of the other nodes with the replicas stored on the first subset of the other nodes.

2. The computer-readable storage medium of claim 1, wherein the method implemented by the program instructions further comprises:
   the first node updating the replica of the object stored on the first node; and
   the first node adding an identification of the object to a respective list of incoherent objects stored on the first node in response to determining that not all of the other nodes successfully committed the first distributed transaction.

3. The computer-readable storage medium of claim 1, wherein the first subset of the other nodes includes at least a quorum of the plurality of nodes.

4. The computer-readable storage medium of claim 1, wherein the method implemented by the program instructions further comprises each respective node of the first subset of the other nodes removing the identification of the object from the respective list of incoherent objects stored on the respective node in response to said synchronizing the replicas stored on the second subset of the other nodes with the replicas stored on the first subset of the other nodes.

5. The computer-readable storage medium of claim 1, wherein each respective node of the first subset of the other nodes updates the replica of the object stored on the respective node by applying a first change to the replica of the object stored on the respective node;
   wherein synchronizing the replicas stored on the second subset of the other nodes with the replicas stored on the first subset of the other nodes comprises each respective node of the second subset of the other nodes applying the first change to the replica of the object stored on the respective node.

6. The computer-readable storage medium of claim 1, wherein the object is a first object of a plurality of objects, wherein each object of the plurality of objects has a plurality of replicas stored on the plurality of nodes;
   wherein the respective list of incoherent objects stored on the second node includes identifications of one or more additional objects of the plurality of objects in addition to the first object;
   wherein the method implemented by the program instructions further comprises:
      for each respective object of the one or more additional objects identified in the list of incoherent objects stored on the second node, the second node attempting to communicate with the plurality of replicas of the respective object to initiate a respective distributed transaction to synchronize the plurality of replicas of the respective object.

7. The computer-readable storage medium of claim 1, wherein the method implemented by the program instructions further comprises:
   the second node periodically attempting to communicate with each of the nodes of the plurality of nodes other than the second node;
   in response to determining that a particular amount of time has passed without successfully communicating with each of the nodes of the plurality of nodes other than the second node, the second node initiating an operation to create one or more new replicas of the object.

8. The computer-readable storage medium of claim 1, wherein the list of incoherent objects stored on the second node is stored in persistent storage of the second node;
   wherein the second node adding the identification of the object to the respective list of incoherent objects stored on the second node comprises:
      the second node storing information indicating addition of the identification of the object without modifying the list of incoherent objects stored in the persistent storage of the second node;
      after storing the information indicating the addition of the identification of the object, the second node updating the list of incoherent objects stored in the persistent storage of the second node to reflect the addition of the identification of the object.

9. The computer-readable storage medium of claim 1, wherein each respective node updating the replica of the object stored on the respective node comprises each respective node applying a change to the replica of the object stored on the respective node.

10. The computer-readable storage medium of claim 1, wherein the replicas of the object stored on the plurality of nodes include a plurality of persistent replicas of the object.

11. The computer-readable storage medium of claim 1, wherein the object is a file; wherein each replica of the object is a replica of the file.

12. The computer-readable storage medium of claim 1, wherein the method implemented by the program instructions further comprises the first node receiving an update message; wherein the first node initiates the first distributed transaction in response to the update message to attempt to synchronously update the replicas of the object stored on the other nodes.

13. A system comprising:
a plurality of nodes;
wherein the plurality of nodes includes memory storing program instructions executable to implement a method comprising:
storing a respective replica of an object on each respective node of the plurality of nodes;
a first node of the plurality of nodes initiating a first distributed transaction to attempt to synchronously update the replicas of the object stored on each of other nodes of the plurality of nodes, wherein each respective node of a first subset of the other nodes successfully commits the first distributed transaction to update the replica of the object stored on the respective node, and wherein each node of a second subset of the other nodes does not successfully commit the first distributed transaction; and
each respective node of the first subset of the other nodes adding an identification of the object to a respective list of incoherent objects stored on the respective node in response to determining that not all of the other nodes successfully committed the first distributed transaction;
wherein the first subset of the other nodes includes a second node of the plurality of nodes;
wherein the method implemented by the program instructions further comprises:
the second node adds the identification of the object to the respective list of incoherent objects stored on the second node, the second node attempting to communicate with each of the plurality of nodes other than the second node; and
in response to successfully communicating with each of the plurality of nodes other than the second node, the second node initiating a second distributed transaction to synchronize the replicas stored on the second subset of the other nodes with the replicas stored on the first subset of the other nodes.

14. The system of claim 13, wherein the method implemented by the program instructions further comprises:
the first node updating the replica of the object stored on the first node; and
the first node adding an identification of the object to a respective list of incoherent objects stored on the first node in response determining that not all of the other nodes successfully committed the first distributed transaction.

15. A method comprising:
storing a respective replica of an object on each respective node of a plurality of nodes;
a first node of the plurality of nodes initiating a first distributed transaction to attempt to synchronously update the replicas of the object stored on each of other nodes of the plurality of nodes, wherein each respective node of a first subset of the other nodes successfully commits the first distributed transaction to update the replica of the object stored on the respective node, and wherein each node of a second subset of the other nodes does not successfully commit the first distributed transaction; and
each respective node of the first subset of the other nodes adding an identification of the object to a respective list of incoherent objects stored on the respective node in response to determining that not all of the other nodes successfully committed the first distributed transaction;
wherein the first subset of the other nodes includes a second node of the plurality of nodes;
wherein the method further comprises:
after the second node adds the identification of the object to the respective list of incoherent objects stored on the second node, the second node attempting to communicate with each of the plurality of nodes other than the second node; and
in response to successfully communicating with each of the plurality of nodes other than the second node, the second node initiating a second distributed transaction to synchronize the replicas stored on the second subset of the other nodes with the replicas stored on the first subset of the other nodes.

16. The method of claim 15, further comprising:
the first node updating the replica of the object stored on the first node; and
the first node adding an identification of the object to a respective list of incoherent objects stored on the first node in response to determining that not all of the other nodes successfully committed the first distributed transaction.

* * * * *

UNITED STATES PATENT AND TRADEMARK OFFICE
CERTIFICATE OF CORRECTION

PATENT NO. : 7,500,020 B1 Page 1 of 1
APPLICATION NO. : 10/749365
DATED : March 3, 2009
INVENTOR(S) : Navin Kabra et al.

It is certified that error appears in the above-identified patent and that said Letters Patent is hereby corrected as shown below:

In the Claims:

Claim 13, col. 27, line 49, please change "the second node" to "after the second node".

Signed and Sealed this

Nineteenth Day of May, 2009

JOHN DOLL
*Acting Director of the United States Patent and Trademark Office*